United States Patent [19]

Yao et al.

[11] Patent Number: 4,801,484
[45] Date of Patent: Jan. 31, 1989

[54] HIGHLY LOADED COALESCED FOAM

[75] Inventors: Peter C. Yao, Pickerington; Bruce A. Malone, Granville, both of Ohio

[73] Assignee: The Dow Chemical Company, Midland, Mich.

[21] Appl. No.: 143,430

[22] Filed: Jan. 13, 1988

[51] Int. Cl.$^4$ .............................................. B32B 7/02
[52] U.S. Cl. .................... 428/294; 264/46.1; 264/45.1; 264/45.9; 428/398; 521/79; 521/81; 521/134; 521/143; 521/146; 521/149
[58] Field of Search .............. 428/294, 398; 264/46.1, 264/45.1, 45.9; 521/79, 81, 134, 143, 146, 149

[56] References Cited

U.S. PATENT DOCUMENTS

| 4,263,360 | 4/1981 | Adelman | 428/316.6 |
| 4,321,299 | 3/1982 | Adelman | 428/317.1 |
| 4,584,225 | 4/1986 | Adelman | 428/317.3 |

Primary Examiner—Morton Foelak

[57] ABSTRACT

Highly loaded improved closed cell foams comprising a plurality of coalesced strands or profiles of an alkenyl aromatic thermoplastic synthetic resin or mixture of an olefin polymer resin and a copolymer of ethylene with one or more copolymerizable comonomers having a lower melting point than the olefin polymer resin. The loading of the nucleating additive is in a range of about 0.5 to about 50 weight percent, based on total resin weight. When highly loaded with carbon black these foams are electroconductive foams.

20 Claims, 2 Drawing Sheets

HIGHLY LOADED COALESCED FOAM

BACKGROUND OF THE INVENTION

The present invention relates to foamed products. More particularly, the present invention relates to unique foam products containing a high loading of a nucleating solid at low densities. More particularly, the present invention relates to such a highly loaded foam comprising a plurality of coalesced distinguishable expanded strands or profiles.

Foamed objects comprising a plurality of coalesced distinguishable expanded strands of foamed polymers (strand foams) have been previously disclosed in U.S. Pat. No. 3,573,152. The foam objects are prepared by extruding a foamable thermoplastic material through a multi-orifice die plate, whereby the individual foamable elements of the strand are formed, expanded and coalesced upon emerging from the die orifices. For the teachings contained therein, U.S. Pat. No. 3,573,152 is herein incorporated in its entirety by reference thereto.

Although the previously mentioned U.S. Pat. No. 3,573,152 discloses that polyethylene resins may be appropriately employed in the preparation of strand foams according to the teachings therein contained, despite diligent efforts by the present inventors, no polyethylene strand foam has been successfully prepared following the teachings of such references.

Closed cell polyethylene foams are widely employed in the field of packaging in order to provide cushion properties. Fragile objects intended to be transported may be encased and supported in a closed cell foamed polyethylene cushion adapted to conform to the external shape of the object for which protection is desired. Presently known polyethylene foam cushion materials possess properties adapted to provide particular cushioning performance. For example, higher density foams are suitably employed to achieve peak deceleration forces between about 40 to 50G's (the gravitational constant) at static loadings of between about 0.5 and 1.5 pounds per square inch in standard 24 inch drop tests. At reduced static loadings, between about 0.1 and about 0.5 pounds per square inch, lower density foams on the order of about 1.2 to about 1.8 pounds per cubic foot may be employed. However, suitable cushioning, i.e. peak deceleration forces less than about 50G's are not obtainable except upon the use of thicker amounts of cushioning foam. Larger thicknesses of cushioning foam result in excess packaging sizes and concomitant elevated shipping costs.

For various reasons high loadings of nucleating solids may also be incorporated into foam, particularly a large cross-section foam plank. The nucleating additive may be, for example, a carbon black or a conductive fiber added to produce antistatic or conductive foam: a fire retardant added to improve foam fire resistance; an inert solid or fiber added to reduce processing costs or change the foam physical properties; an additional polymer added to change some foam property; a pigment added to change foam color or appearance; or any other nucleating solid additive, semi-solid additive or combinations of such nucleating additives.

Often though, the amount of nucleating additives which can be added is severely limited due to the undesirable small cell size in the foam which results when the desired level of nucleating additives are added. This over nucleation results in small cross-sections, folding of foam planks, excessive open cells, poor surface appearances and foam collapse. It is not possible sometimes to produce larger cross-section foams with the desired levels of the nucleating additives. Carbon black at a level of five (5) percent or greater and nonantimony fire retardants at a level of ten (10) percent are examples of these problems.

It would be desirable to provide a highly loaded closed cell foam.

It would be desirable to provide a highly loaded closed cell foam plank having a large cross-section.

In order to provide such an improved closed cell foam, the present inventors have investigated preparing strand foam by the techniques disclosed in U.S. Pat. No. 3,573,152. In particular, in using polyethylene resins and standard chlorofluoro-carbon blowing agents and a suitable die having a multitude of closely spaced small holes therein, the emerging strands could not be made to coalesce or adhere together under any processing conditions employed. In particular, when the foaming temperature of the resin was increased in an attempt to provide a tacky surface to the emerging strands, foam collapse was experienced. Similarly, when the strands were reheated after emerging from the die face, foam collapse was again experienced.

In order to provide such a highly loaded improved closed cell foam, the present inventors have investigated preparing highly loaded carbon black strand foam by the techniques disclosed in U.S. Pat. No. 4,431,575. Although this patent reports a high loading of carbon black for polyolefin resin compositions, a stable polyethylene foam plank through a single slot die with carbon black loadings above five (5) percent could not be obtained.

It would be desirable to provide a method for producing a highly loaded closed cell strand foam comprising an alkenyl aromatic thermoplastic synthetic resin-particularly a polystyrene resin or a polyolefin resin, particularly a polyethylene resin.

In addition, it would be desirable to provide a highly closed cell polystyrene resin or polyethylene resin strand foam suitable for antistatic or electroconductive purposes.

SUMMARY OF THE INVENTION

Figure 1:
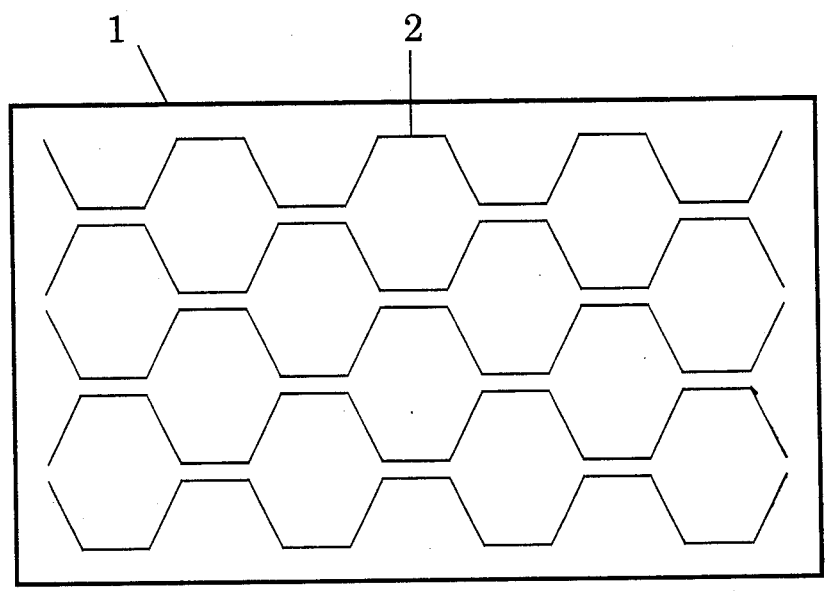
In FIG. 1, there is depicted a die face plate comprising narrow slits suitable for preparing a coalesced foam having a honeycomb structure.

According to the present invention, there is now provided a highly loaded closed cell foam structure comprising a plurality of coalesced extruded strands or profiles of a mixture comprising:

(a) a thermoplastic resin selected from the group consisting of:
(1) an olefin resin blend of
(a) an olefin polymer selected from the group consisting of homopolymers of ethylene or propylene, copolymers of ethylene or propylene with one or more $C_{4-8}$ α-olefins and mixtures thereof; and (b) an interpolymer of ethylene and at least one comonomer, said interpolymer having a melting point less than the melting point of olefin polymer (a); and (2) an alkenyl aromatic synthetic resinous material; and (b) a nucleating additive in a range of about 0.5 to about 50 percent, based on the total weight of the thermoplastic resin; provided further that the foam structure has a density from about 0.5 to about 5.0 lbs/ft$^3$ and the strands or profiles are disposed substantially parallel to the longitudinal axis of the foam.

DETAILED DESCRIPTION OF THE INVENTION

The strand foams of the present invention are prepared from an alkenyl aromatic thermoplastic synthetic resin or a homogeneous blend of olefin resins and are highly loaded in a range of from about 0.5 to about 50 percent, based on the blend weight. Component (a) of the olefin resin blend may be any homopolymer of ethylene, e.g., low density polyethylene; high density polyethylene; intermediate density poly-ethylene; or ultra-high molecular weight polyethylene, a copolymer of ethylene and one or more C$_{4-8}$ α-olefins, e.g., linear low density polyethlene, or a mixture thereof. Preferably, component (a) comprises low density polyethylene having a density from about 0.90 to 0.95 g/cc and the melt flow rate from about 0.1 to 10. Most preferably, the melting point of component (a) is from about 100° to about 130° C.

Preferred amounts of component (a) in the olefin resin blend are from about 60 percent to about 90 percent by weight.

Component (b) in the olefin resin blend comprises an interpolymer of ethylene and at least one additional comonomer. Examples of suitable comonomers include the well known carboxyl-containing ethylenically unsaturated comonomers having up to about 12 carbons, especially ethylenically unsaturated carboxylic acids and ethylenically unsaturated carboxylic acid esters, ethylenically unsaturated dicarboxylic acid anhydrides, etc. Additional suitable comonomers include carbon monoxide, conjugated dienes such as butadiene, etc. Preferred comonomers are carboxyl-containing ethylenically unsaturated comonomers. Highly preferred comonomers include ethylenically unsaturated C$_{3-8}$ carboxylic acids such as acrylic acid, methacrylic acid, etc. and C$_{1-5}$ alkyl esters thereof; vinyl esters such as vinyl acetate; and ethylenically unsaturated dicarboxylic acid anhydrides such as maleic anhydride.

The polymers of ethylene and at least one carboxyl-containing comonomer may be prepared by addition polymerization according to known techniques, or by a grafting reaction of the reactive carboxyl-containing containing comonomer with a preformed polymer of ethylene. Additional elastomeric components such as polyisobutylene, polybutadiene, ethylene/propylene copolymers, and ethylene/propylene/diene interpolymers may be included in the blend if desired but are not preferred. Moreover, additional components such as crosslinking agents designed either to provide latent crosslinking of the ethylenic polymer, such as the silane functional crosslinking agents or covalent or ionic crosslinking agents, may be included if desired. However, in the present invention, for large cross-section ethylenic polymer foam plank it is preferred that the foam be non-crosslinked.

In a preferred olefin resin blend composition, component (b) comprises a copolymer of ethylene and acrylic acid or ethylene and vinyl acetate containing from about 85 percent to about 98 percent ethylene. Most preferably, component (b) is a homogeneous random copolymer of ethylene and acrylic acid. Random homogeneous copolymers of ethylene and acrylic acid may be obtained under the tradename EAA available from The Dow Chemical Company. Ethylene vinyl acetate copolymers may be obtained under the tradename Elvax from E. I. Du Pont de Nemours & Co. Anhydride modified copolymers of ethylene are available under the tradename Plexar from Norchem, Inc.

In yet another preferred olefin resin blend composition, component (b) comprises an ionomer which is an ethylene copolymer with pendant carboxylic acid groups partially or completely neutralized with cations such as $NH_4+$, $Na+$, $Zn++$, and $Mg++$. Such ionomers may be obtained under the tradename Surlyn from E. I. Du Pont de Nemours & Co.

By the term "compatible" is meant that components (a) and (b), in the olefin resin blend, when mixed, demonstrate either a single Tg or distinct Tg's such that the differences between them is less than the differences between the separately measured Tg's of the unblended components.

Blending of component (a) and component (b) in order to provide a suitable olefin resin blend for melt extrusion to prepare the strand foams of the present invention is accomplished according to known techniques in the art. Suitably, a mixer, extruder or other suitable blending device is employed to obtain a homogeneous melt. An extruder or any other suitable device is then employed to incorporate a known blowing agent such as a chlorofluorocarbons, e.g., 1,2-dichloro-tetra-fluoroethane, 1,2-difluorotetrachloroethane, chlorotrifluoromethane, and mixtures thereof with additional agents such as halogeneted hydrocarbons, hydrocarbons, carbon dioxide, water, etc.

Alternatively an alkenyl aromatic termoplastic synthetic resin may be selected to produce the highly loaded strand foam. By the term "alkenyl aromatic thermoplastic synthetic resin is meant a solid polymer of one or more polymerizable alkenyl aromatic compounds. The polymer or copolymer comprises in chemically combined form, at least 50 percent by weight of at least one alkenyl aromatic compound having the general formula

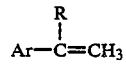

wherein Ar represents an aromatic hydrocarbon radical, or an aromatic halo-hydrocarbon radical of the benzene series, and R is hydrogen or the methyl radical. Examples of such alkenyl aromatic resins are the solid homo polymers of styrene, alpha-methylstyrene, o-methylstyrene, m-methylstyrene, p-methylstyrene, ar-ethylstyrene, ar-vinylxylene, ar-chlorostyrene, ar-bromostyrene; the solid coplymers of two or more of such alkenyl aromatic compounds with minor amounts of other readily polymerizable olefinic compounds such as methylmethacrylate, acrylonitrile, maleic anhydride, citraconic anhydride, itaconic anhydride, rubber reinforced (either natural or synthetic) styrene polymers, etc.

The volatile blowing agents are those conventionally known for alkenyl aromatic thermoplastic resin foams.

Additional agents such as nucleating agents, extrusion aids, antioxidants, colorants, pigments, etc. may also be included in the alkenyl aromatic thermoplastic resin or the olefin resin blend. However those that function as nucleating additives, which cause foam problems can now be added in an amount of from about 0.5 to about 50 weight percent, based on resin weight, into the foams of the present invention. Those preferred highly loaded closed cell coalesced foam structures are those having a large cross-section.

Large cross-section foam and plank foams are terms which define those foam structures having a cross-sectional area of at least twelve (12) square inches, preferably at least 18 square inches, and a minimal cross-sectional dimension of at least one quarter inch, preferably one half inch.

The molten extrudate is then forced through a die plate comprising numerous small holes in a suitably desired spacial arrangement or alternatively an array of slits, desirably in an oscillating form such as a sine wave, honeycomb, square saw tooth or triangular saw tooth wave pattern. Most desirably, the alternating slits are offset so that maxima and minima of adjacent rows are aligned with one another so as to assure contact between rows of extrudate. In one embodiment of the die plate, illustrated in FIG. 1, the die face plate, 1, contains several rows of narrow slits, 2, comprising equal length segments joined at 60° angles and aligned with respect to neighboring slits to provide a honeycomb shaped foam structure of separately extruded and coalesced profiles. Such foams prepared wherein the adjoining profiles contain sections adjacent one another having significant surface areas in mutual contact are particularly desired in order to provide structures of improved strength.

Alternately in the use of holes in the die face plate, various geometric shapes particularly noncircular shapes, such as X-, cross- or star-shaped geometry may be employed. he holes or slits may be generated in the die face plate by the use of electromagnetic discharge or laser cutting technology as is well-known in the art. The spacing and arrangement of the holes or slits in the die face plate may be adjusted in order to vary the ultimate cushioning properties of the strand foam and provide in cross-sectional view, coalesced foam structures of repeating structure containing voids having the shape of polygons or closed curves of any description. The only limitation on spacial arrangement of the die orifices is that contact and coalescence of adjacent strands or profiles after extrusion from the die face plate must be achieved.

Figure 2:
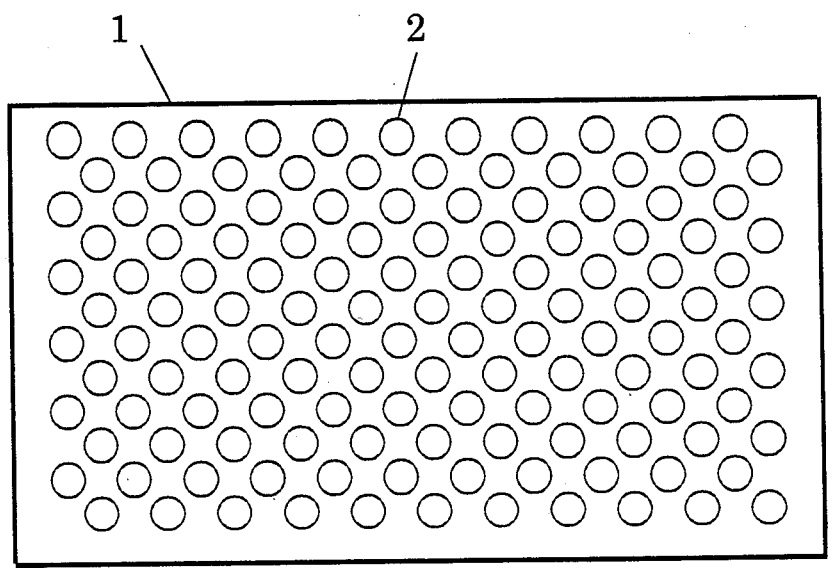
In FIG. 2, there is depicted a die face plate comprising small circular orifices suitable for preparing a coalesced foam.

In the preferred embodiment of the die plate, illustrated in FIG. 2, the die face plate, 1, contains several rows of small circular holes, 2, which rows may be aligned so that the holes in each row are directly over each other or are offset, as seen in FIG. 2. The holes may vary in size, but preferably the holes are the same size and preferably that size is about 0.1 inch diameter or less. Preferably the hole size is less than about 0.05 inch diameter.

The die, with hole sizes less than about 0.1 inch in diameter, cause a high pressure drop which acts to very uniformly distribute the flow through each hole even if the die face is larger than the diameter of the foamable material stream entering the die. This eliminates the need to make compensations for flow distribution in a specific die design, thus allowing the making of complicated shapes without concern for a flow distribution effect.

By providing a single die with a large number of small holes, as opposed to a specially produced die useful in producing only a single shape, a variety of complicated shapes can be produced from the same die by sealing or blocking all the holes but the holes of the desired shape.

The sealing or blocking of holes can be done by any method, such as for example remote actuation of hole blockers, but the preferred methods are the sealing of the holes with a material which can be removed, such as epoxy, or the placing or a template on the side of the die that first receives the flow of foamable material so that the template effectively seals off the holes that are desired to be blocked.

The sealing material or template is easily removable so that another shape can be quickly produced from the same die with a different template or configuration of sealing material with minimal amount of time necessary to change the die.

Foams having gross densities (that is densities of the closed-cell foam including interstitial volumes between strands or profiles) varying from about 0.5 to about 5 pounds per cubic foot ($lb/ft^3$) may be obtained according to the foregoing technique. Preferred foams are those having a density from about 0.5 to about 3.0 ($lb/ft^3$. More preferred foams are those having a density from about 1.0 to about 2.8 $lb/ft^3$ and most preferably from about 1.2 to about 2.0 $lb/ft^3$.

The open channels or voids in the foams of the present invention are arranged in a direction parallel to the extruded strands. The presence of such open channels contributes to the unique cushioning properties of the present invented foam and their shape, size, and frequency of occurrence may be varied through adjustments of the size, location and shape of the die face plate's holes or slits. In one embodiment, the voids occurring in the interior of the foam structure or in one portion thereof may be larger, differently shaped of more or less numerous than those voids that are nearer the surface or in the remaining portion of the foam structure in rder to provide tailored cushioning properties in the resulting structure. Preferably the individual strands have a maximum cross-sectional dimension and the profiles have a maximum thickness from about 0.5 to about 10.0 mm (millimeters), most preferable 1.0 to 5.0 mm.

The coalesced strands may form a plank or other object having a larger cross-sectional area than is possible utilizing existing polyolefin foam extrusion techniques. For example, utilizing equivalent extrusion rates, a foam structure according to the invention may be prepared having a cross-section that is up to 8 times larger than the maximum cross-sectional area of an extruded foam article prepared utilizing a single orifice opening.

Desirably, foams according to the present invention allow the achievement of improved cushioning of objects particularly at low static loadings. For example, preferably according to the present invention, two inch thick samples of the invented closed-cell strand foams when tested at a 24 inch drop height have dynamic cushioning properties such that objects inducing static loads (SL) of from about 0.18 to about 0.5 $lb/in^2$ (pounds per inches squared) at the earth's surface experience a peak deceleration of less than about 65G's, preferably loads of from about 0.15 to about 0.4 $lb/in^2$ experience peak decelerations of less than about 55G's.

In measuring such cushioning properties, the technique employed is ASTM D-1596.

Having described the invention, the following examples are included as illustrative and are not to be construed as limiting. Parts per hundred and weight percent measurements are based on resin weight. Examples 1–3 and the Cushion Testing are illustrative of the general teachings in the specification as to coalesced foam and the method of making such foam and are not examples of the present invention. Example 4 is an example of the present invention.

EXAMPLE 1

A blend of 80 weight percent polyethylene (PE-620, available from The Dow Chemical Company) and 20 weight percent of a hoogeneous random copolymer of ethylene and acrylic acid containing approximately 6.5 percent acrylic acid (EAA-459 available from The Dow Chemical Company) and 22 parts per hundred 1,2-dichlorotetrafluoroethane blowing agent is extruded through a 1.5 inch (38.1 mm) extruder connected to a die having 89 equally spaced circular shaped holes arranged in five rows. The holes were approximately 0.040 inches (1.0 mm) in diameter and spaced approximately 0.125 inches (3.3 mm) between centers. Upon extrusion, the individual strands adhered to one another to form a uniformly coalesced closed-cell structure. No evidence of foam instability was observed. The resulting foam had a gross density of about 2.4 lb/ft$^3$ (0.038 g/cc (grams/cubic centimeter)) and had approximately 10 percent by volume open channels running in parallel rows in the extrusion direction,. The diameter of the closed-cell strands was approximately 0.125 inch (3.2 mm).

EXAMPLE 2

The conditions of Example 1 were substantially repeated excepting that the resin blend comprised approximately 40 percent by weight of a homogeneous random copolymer of ethylene and acrylic acid containing 6.5 percent acrylic acid (EAA-459 available from The Dow Chemical Company) and 30 parts per hundred 1,2-dichlorotetrafluoroethane blowing agent. The remainder of the resin blend comprised low density polyethylene (PE-620 available from The Dow Chemical Company). The resin blend was extruded through a die face plate having approximately 800 holes. Each hole was approximately 0.04 inches (1.0 mm) in diameter. Holes and rows were equally spaced at approximately 0.125 inches (3.2 mm) between centers. The resulting foam had approximately 15 percent open volume in channels running in the extrusion direction and had a foam density of 1.8 lb/ft$^3$ (0.029 g/cc).

EXAMPLE 3

A die face plate having 28 individual X-shaped incisions the height and width of each X approximately 0.10 inches (4.8 mm) and the width of the incision being approximately 0.015 inches (0.4 mm). The X-shaped incisions were arranged in 5 rows, spaced approximately .0625 inches (1.6 mm) apart. A resin blend substantially the same of that in Example 1 was then extruded through the die face plate at a rate such that upon expansion, the resulting X-shaped foam strands contacted one another on the tips only of the X-shaped cross-sectional dimensions. The resulting foam contained approximately 35 percent by volume open channels in the extrusion direction of the plank. The foam gross density was 2.6 lb/ft$^3$ (0.042 g/cc).

EXAMPLE 4

A blend of 80 weight percent polyethylene (PE-4005, available from The Dow Chemical Company) and 20 weight percent of Suryln-8660 (obtained from E. I. Du Pont de Nemours & Co.), and 23 parts per hundred 1,2-dichlorotetrafluoroethane blowing agent is extruded through a 1.5 inch (38.1 mm) extruder connected to a die having 89 equally spaced circular shaped holes arranged in five rows. The holes were approximately 0.040 inches (1.0 mm) in diameter and spaced approximately 0.125 inches (3.3 mm) between centers. Levels of 5, 7.5, 8.5 and 10 weight percent carbon black (Ketjenblack 600, a product of AKKZO Chemie N.V.) are added. The resulting foams are stable with a surface appearance and size equivalent to strand foams containing no carbon black. The foam densities range from about 3.0 to about 3.5 lb/ft$^3$ (0.048 to 0.056 g/cc) and have a volume resistivity in the range of about 105 to about 109 ohms/centimeter.

Cushion Testing

Various conventional polyolefin resin foams and the strand foam of Example 2 were tested for cushioning properties. Two inch thick samples of closed cell foams were tested for peak deceleration at 24 inch drop heights. Besides a foam according to the invention prepared according to Example 2, three additional conventional closed-cell foams (a, b, c) were tested. (a) was a foam of 1.4 lb/ft$^3$ (0.022 g/cc) density comprising a blend of ethylene acrylic acid and ethylene vinyl acetate (25 weight percent EAA-1430 available from The Dow Chemical Company, and 75 percent Elvax 470, available from E. I. Du Pont de Nemours & Co.). (b) and (c) were conventional closed-cell polyethylene foams of 1.8 and 2.4 lb/ft$^3$ (0.029 and 0.038 g/cc) density, respectively . Cushioning properties were measured according to ASTM D-1596. A computer generated empirical fit is supplied for each of the foams. The fit is a formula, wherein peak deceleration, measured in G's, is defined as a function of static load (SL) for the various curves.

By reference to the results of the testing, it may be seen that a unique cushioning ability at reduced static loadings is obtained by the foams according to the present invention. In particular, at static loads from about 0.1 to about 0.5 lb/in$^2$, the strand foams of the present invention produce peak decelerations from about 65 to about 45G's or less. More particularly, at static loadings from about 0.15 to about 0.4 lb/in$^2$, the compositions of the invention provide peak decelerations less than about 55G's, which are unattainable by the use of equivalent thicknesses of conventional foam cushioning materials.

The computer generated fit for the various curves are as follows:

| Example 2 | G's = 20.7 + 31.1(SL) + 4.3/SL |
|---|---|
| a | G's = 32.5 + 38.2(SL) + 2.5/SL |
| b | G's = 3.2 + 37.2(SL) + 10.9/SL |
| c | G's = 7.2 + 30.1(SL) + 17.7/SL |

While cushioning properties are necessary for some foam uses, other uses may require only high loading of a nucleating additive, while still others may require both.

Accordingly, foams according to the present invention are capable of being highly loaded with nucleating additives without causing detrimental foam problems.

What is claimed is:

1. A highly loaded closed cell foam structure comprising a plurality of coalesced extruded strands or profiles of a mixture comprising:
   (a) a thermoplastic resin selected from the group consisting of:
      (1) an olefin resin blend of
         (a) an olefin polymer selected from the group consisting of homopolymers of ethylene or propylene, copolymers of ethylene or propylene with one or more C4-8 α-olefins and mixtures thereof; and
         (b) an interpolymer of ethylene and at least one comonomer, said interpolymer having a melting point less than the melting point of olefin polymer (a);
         and
      (2) an alkenyl aromatic synthetic resinous material; and
   (b) a nucleating additive in a range of about 0.5 to about 50 percent, based on the total weight of the thermoplastic resin; provided further that the foam structure has a density from about 0.5 to about 5.0 lbs/ft$^3$ and the strands or profiles are disposed in substantially parallel arrangement to the longitudinal axis of the foam.

2. A foam according to claim 1, wherein the foam structure has a minimal cross-sectional area of at least 12 square inches and a minimal cross-sectional dimension of at least one quarter inch.

3. A foam according to claim 1, wherein the foam structure has a minimal cross-sectional area of at least 18 square inches and a minimal cross-sectional dimension of at least one half inch.

4. A foam according to claim 1, wherein the nucleating additive is carbon black.

5. A foam according to claim 4, wherein the carbon black is present in a range of about 5 to about 50 percent.

6. A foam according to claim 1 having a density of from about 0.5 to about 3.0 lb/ft$^3$.

7. A foam according to claim 1 having a density of from about 1.0 to about 2.8 lb/ft$^3$.

8. A foam according to claim 4 having a density from about 1.2 to about 2.0 lb/ft$^3$.

9. A foam according to claim 1, wherein the thermoplastic resin is:
   an olefin resin blend of
      (a) an olefin polymer selected from the group consisting of homopolymers of ethylene or propylene, copolymers of ethylene or propylene with one or more C4-8 α-olefins and mixtures thereof; and
      (b) an interpolymer of ethylene and at least one comonomer, said interpolymer having a melting point less than the melting point of olefin polymer (a).

10. A foam according to claim 9, wherein component (b) is a copolymer of ethylene and acrylic acid or ethylene and vinyl acetate.

11. A foam according to claim 10, wherein component (b) comprises from about 85 to about 98 percent by weight ethylene.

12. A foam according to claim 11, wherein component (b) is a homogeneous random copolymer of ethylene and acrylic acid.

13. A foam according to claim 1, wherein the thermoplastic resin is an alkenyl aromatic synthetic resinous material.

14. A foam according to claim 13, wherein the alkenyl aromatic synthetic resinous material is polystyrene.

15. A foam according to claim 1, wherein the strands are each approximately 0.5 to about 10.0 mm in the largest cross-sectional dimension, or the profiles are each approximately 0.5 to about 10.0 mm in cross-sectional thickness.

16. A foam according to claim 15, wherein the strands are each about 1.0 to 5.0 mm in the largest cross-sectional dimension, or the profiles are each approximately 1.0 to about 5.0 mm in cross-sectional thickness.

17. A foam according to claim 1 additionally comprising a crosslinking agent.

18. A foam according to claim 1, wherein the strands have a circular cross-sectional shape.

19. A foam according to claim 1, wherein the strand's cross-sectional shape is that of a star, cross or X.

20. A foam according to claim 1 wherein the profiles when coalesced describe in cross-section a repeating structure containing voids.

* * * * *

UNITED STATES PATENT AND TRADEMARK OFFICE
CERTIFICATE OF CORRECTION

PATENT NO. : 4,801,484

DATED : January 31, 1989

INVENTOR(S) : Peter C. Yao and Bruce A. Malone

It is certified that error appears in the above-identified patent and that said Letters Patent is hereby corrected as shown below:

Column 1, line 39, "50G's" should read --50 G's--.

Column 1, line 46, "50G's" should read --50 G's--.

Column 5, line 38, "he" should read --The--.

Column 6, line 27, "(lb/ft$^3$." should read --lb/ft$^3$.--.

Column 6, line 66, "65G's" should read --65 G's--.

Column 6, line 68, "55G's" should read --55 G's--.

Column 7, line 16, "hoogeneous" should read --homogeneous--.

Column 8, line 22, "105" should read --$10^5$--.

Column 8, line 23, "109" should read --$10^9$--.

Column 8, line 52, "45G's" should read --45 G's--.

Column 8, line 54, "55G's" should read --55 G's--.

Signed and Sealed this

Sixteenth Day of January, 1990

Attest:

JEFFREY M. SAMUELS

Attesting Officer        Acting Commissioner of Patents and Trademarks